US012752535B2

(12) United States Patent
Sugimoto

(10) Patent No.: US 12,752,535 B2
(45) Date of Patent: Oct. 6, 2026

(54) LIQUID EJECTION HEAD

(71) Applicant: CANON KABUSHIKI KAISHA, Tokyo (JP)

(72) Inventor: Hikaru Sugimoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 78 days.

(21) Appl. No.: 18/921,171

(22) Filed: Oct. 21, 2024

(65) Prior Publication Data

US 2025/0135778 A1 May 1, 2025

(30) Foreign Application Priority Data

Nov. 1, 2023 (JP) ................................ 2023-187916

(51) Int. Cl.
*B41J 2/14* (2006.01)
*B41J 2/16* (2006.01)

(52) U.S. Cl.
CPC ............ *B41J 2/1433* (2013.01); *B41J 2/162* (2013.01); *B41J 2/164* (2013.01)

(58) Field of Classification Search
CPC . B41J 2/1433; B41J 2/162; B41J 2/164; B41J 2/1603; B41J 2/1631; B41J 2/1645; B41J 2/1606
See application file for complete search history.

(56) References Cited

U.S. PATENT DOCUMENTS

2020/0198345 A1* 6/2020 Tamamori .............. B41J 2/1603

FOREIGN PATENT DOCUMENTS

JP 2016089023 A * 5/2016
JP 2017-154322 A 9/2017

OTHER PUBLICATIONS

Shu Hiroaki, "Method for Producing Water-Repellent Film" (JP 2016089023 A), May 23, 2016, [Abstract} (Year: 2016).*

* cited by examiner

*Primary Examiner* — Lisa Solomon
(74) *Attorney, Agent, or Firm* — Venable LLP

(57) ABSTRACT

A liquid ejection head includes a substrate, and a member provided on the substrate. The member has an ejection orifice or ejection orifices formed therein to eject a liquid. The member is formed of a water repellent layer having a multilayer structure including a first water repellent layer as an outermost layer and a second water repellent layer provided directly below the first water repellent layer. The first water repellent layer has a water contact angle of 80° or more, while the second water repellent layer has a flexural modulus of 3 to 7 GPa or a hardness of 0.18 to 0.30 GPa.

8 Claims, 14 Drawing Sheets

LIQUID EJECTION HEAD

BACKGROUND OF THE INVENTION

Field of the Invention

The present disclosure relates to a liquid ejection head and specifically relates to a liquid ejection head having a water repellent material structure which has both ink resistance and wear resistance (water repellency stability).

Description of the Related Art

A liquid ejection apparatus represented by an ink-jet printer has a liquid ejection head. The liquid ejection head is provided with an ejection orifice or ejection orifices and ejects an ink from the ejection orifice or orifices. In such a liquid ejection head, if a large amount of liquid adheres to the ejection orifice surface where the ejection orifice or orifices are opened, this liquid may affect the ejection of the liquid. For this reason, the ejection orifice surface needs to be subjected to a water repellent treatment so as to make the liquid less likely to adhere to the ejection orifice surface. Under these circumstances, a technique has been established to impart water repellency to an outermost surface of a liquid ejection head by providing a rough-textured structure. For example, Japanese Patent Application Laid-Open No. 2017-154322 discloses a liquid ejection head whose surface is roughened with depressions formed by embedding and removing fine particles in that order, so that the surface structure is made less likely to collapse even under an external force such as wiping.

SUMMARY OF THE INVENTION

Japanese Patent Application Laid-Open No. 2017-154322 makes it possible for the outermost surface of the liquid ejection head to keep the water repellency against a stress such as wiping by giving the rough-textured structure to the outermost surface of the liquid ejection head. However, since the liquid ejection head is in contact with a solvent in an ink for a long period of time, the solvent in the ink permeates into head constituting members and causes the members to swell over time, which poses a problem that a channel forming layer and an outermost layer having the water repellency are detached from each other.

Therefore, an object of the present disclosure is to provide a liquid ejection head capable of preventing ink permeation into resins while maintaining water repellency of an outermost surface even under a stress such as wiping.

The present disclosure relates to a liquid ejection head including a substrate and a member provided on the substrate, the member having an ejection orifice formed therein to eject a liquid. The member is formed of a water repellent layer having a multilayer structure. The water repellent layer includes a first water repellent layer, as an outermost layer, having a water contact angle of 80° or more, which is formed of a cured product of a first water repellent resin composition comprising a first water repellent resin and inorganic fine particles dispersed therein, and a second water repellent layer, as provided directly below the first water repellent layer, having a flexural modulus of 3 to 7 GPa or a hardness of 0.18 to 0.30 GPa, which is formed of a cured product of a second water repellent resin composition comprising a second water repellent resin.

Further features of the present invention will become apparent from the following description of exemplary embodiments with reference to the attached drawings.

BRIEF DESCRIPTION OF THE DRAWINGS

FIG. 3A is a schematic cross-sectional view illustrating a step of preparing a substrate. FIG. 3B is a schematic cross-sectional view illustrating a step of forming a layer of a positive photosensitive resin. FIG. 3C is a schematic cross-sectional view illustrating a step of exposing the layer of the positive photosensitive resin to light. FIG. 3D is a schematic cross-sectional view illustrating a step of performing a development process. FIG. 3E is a schematic cross-sectional view illustrating a step of forming a layer of a lower-layer resin composition, a layer of a second water repellent resin composition, and a layer of a first water repellent resin composition in this order. FIG. 3F is a schematic cross-sectional view illustrating a step of forming a supply port in the substrate by anisotropic etching. FIG. 3G is a schematic cross-sectional view illustrating a step of performing light exposure through a mask. FIG. 3H is a schematic cross-sectional view illustrating a step of forming a channel forming member and an ejection orifice forming member by a development process.

DESCRIPTION OF THE EMBODIMENTS

Figure 1A:
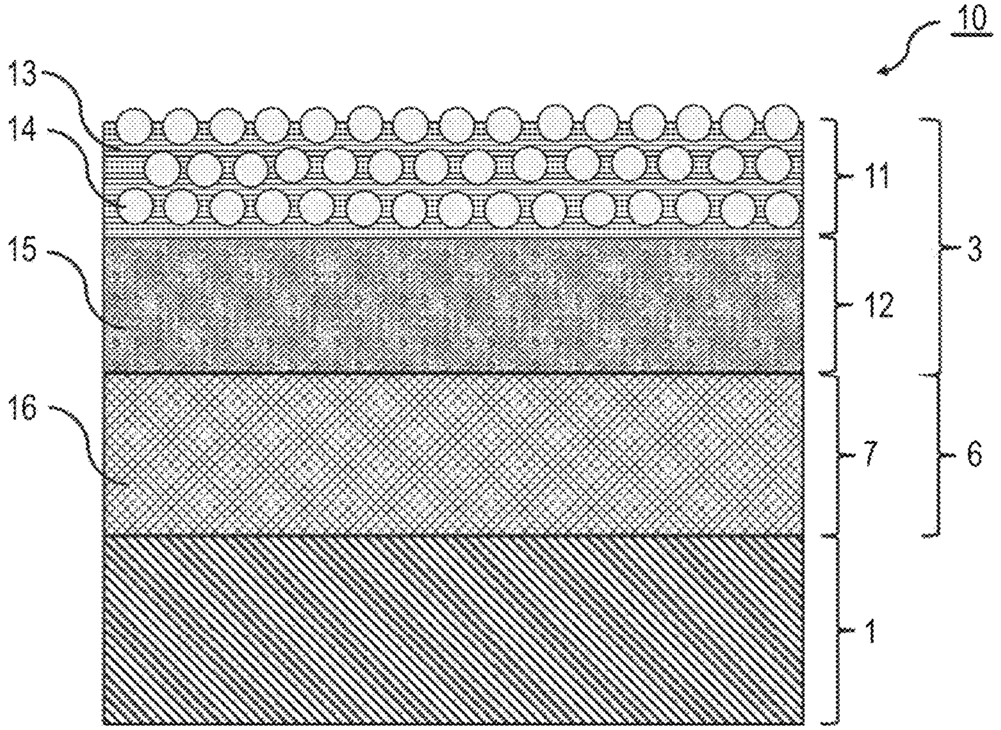
FIG. 1A is a schematic cross-sectional view illustrating a layered structure of a member in which ejection orifices are formed in a liquid ejection head according to the present disclosure, the view illustrating a normal state without a stress applied to an outermost surface.

Hereinafter, preferred embodiments of the present disclosure will be described in detail with reference to the drawings. Although an example in which a liquid ejection head and a production method thereof according to the present disclosure is applied will be below described, a liquid ejection head and a production method thereof according to the present disclosure are not limited to this example. In the following description, components having the same function will be designated with the same reference sign in the drawings, and description thereof will be omitted in some cases.

In the present disclosure, a statement expressing a numerical range such as "XX or more and YY or less" or "XX to YY" means a numerical range including the endpoints, that is, the lower limit and the upper limit, unless otherwise specified. When numerical ranges are stated in stages, the upper and lower limits of the numerical ranges may be selected in any combination.

A liquid ejection head of the present disclosure is a liquid ejection head including a substrate and a member provided on the substrate, the member having ejection orifices formed therein to eject a liquid, wherein the member has a layered structure with a specific configuration.

Figure 1B:
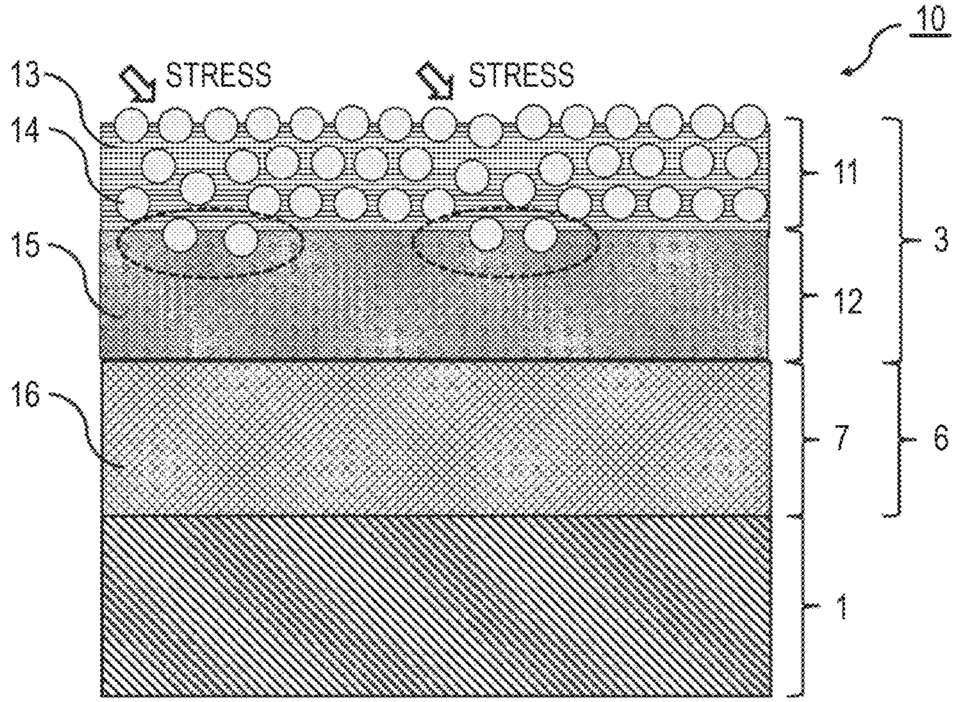
FIG. 1B is a schematic cross-sectional view of a state of the layered structure illustrated in FIG. 1A with a stress applied to the outermost surface.

Hereinafter, description will be given of the member having the specific layered structure which is a feature of the present disclosure. FIGS. 1A and 1B are cross-sectional views illustrating a layered structure of a member 3 with ejection orifices formed therein, which is a characteristic portion of the liquid ejection head according to the present disclosure. FIG. 1A illustrates a normal state where no stress is applied to an outermost surface of the member 3, and FIG. 1B illustrates a state where an external force is applied to the outermost surface of the member 3. For convenience of explaining the layered structure, illustration of members other than three layers are omitted in FIGS. 1A and 1B.

The member 3 illustrated in FIGS. 1A and 1B is formed on a substrate 1 and has a multilayer structure in which a first water repellent layer 11, a second water repellent layer 12, and a lower resin layer 7, which may be provided if necessary, are layered in this order from the outermost surface side. The first water repellent layer 11 has a water contact angle of 80° or more, and is formed of a cured product of a first water repellent resin composition 18 in which inorganic fine particles 14 are dispersed in a first water repellent resin 13. The second water repellent layer 12 is formed directly below the first water repellent layer 11, has a flexural modulus of 3 to 7 GPa or a hardness of 0.18 to 0.30 GPa, and is formed of a cured product of a second water repellent resin composition 19 containing a second water repellent resin 15.

In the present disclosure, the member 3 in which ejection orifices 2 to eject the liquid are formed is formed of the water repellent layers in the multilayer structure and the inorganic fine particles 14 are dispersed in the layer located on the outermost side (the first water repellent layer 11). The multilayer structure is designed such that the layer directly below the above layer is a layer having an appropriate hardness (flexural modulus) (the second water repellent layer 12), so that the liquid ejection head having both ink resistance and wear resistance can be constructed.

As illustrated in FIG. 1A, the first water repellent layer 11 provided as the outermost layer exhibits high water repellency due to a rough-textured structure derived from the inorganic fine particles 14 dispersed in the layer. In addition, as illustrated in FIG. 1B, even when a stress is applied to the surface of the first water repellent layer 11, a decrease in the water repellency of the surface of the first water repellent layer 11 can be suppressed by the second water repellent layer 12 with the appropriate hardness (flexural modulus) provided directly below the first water repellent layer 11. Presumably the decrease in the water repellency is suppressed for the following reason.

Having appropriate flexibility, the second water repellent layer 12 incorporates some of the inorganic fine particles 14 contained in the first water repellent layer 11. This allows the inorganic fine particles 14 to remain neatly arranged and enables retention of the surface shape, thereby suppressing the decrease in the water repellency of the surface.

Moreover, even when the member 3 comes into contact with a solvent in a liquid such as ink, the second water repellent layer 12 having the appropriate hardness can block permeation of the solvent in the liquid and suppress a decrease in the adhesion due to swelling of the materials resulting from the permeation.

Hereinafter, each of the layers will be described specifically.

<First Water Repellent Layer 11>

The first water repellent layer 11 has a water contact angle of 80° or more on its outermost surface, and is formed of a cured product of the first water repellent resin composition 18 in which the inorganic fine particles 14 are dispersed in the first water repellent resin 13. The existence of the inorganic fine particles 14 in the first water repellent resin 13 imparts a rough-textured structure to the outermost surface layer and improves the water repellency of the outermost surface layer.

(Inorganic Fine Particles 14)

The inorganic fine particles 14 are not particularly limited in type, but has to be hydrophobic in order to exhibit the water repellency. Examples thereof include alumina, silica, aluminum, and so on.

As the inorganic fine particles 14, a commercially available product may be used such, for example, as fumed silica "product name: R974" (average particle size 12 nm) and "product name: R812" (average particle size 7 nm) both manufactured by NIPPON AEROSIL CO., LTD., and "product names: Zircostar ZP-153" and "Zircostar HR-101" (both average particle size 11 nm) manufactured by NIPPON SHOKUBAI CO., LTD.

Figure 11A:
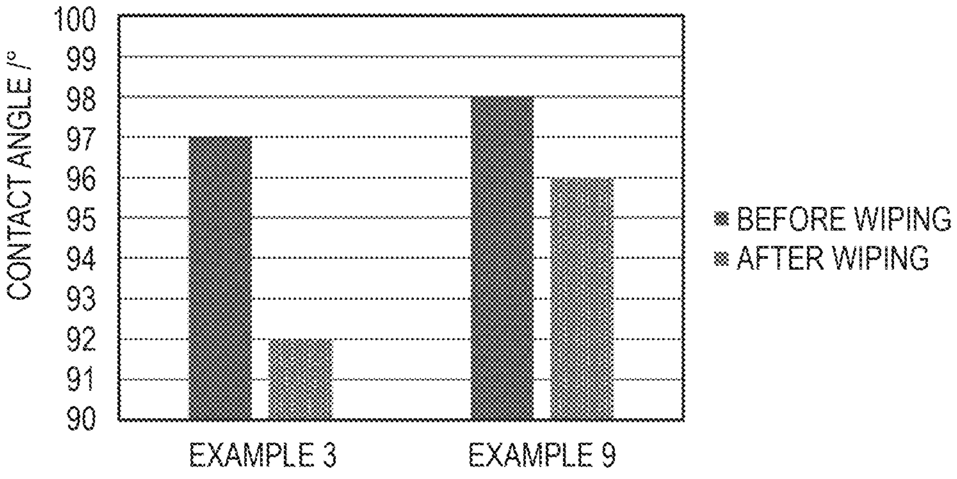
FIG. 11A is a graph presenting a relationship between types of inorganic fine particles contained in the first water repellent layer and the water contact angle of the outermost surface of the first water repellent layer.
Figure 11B:
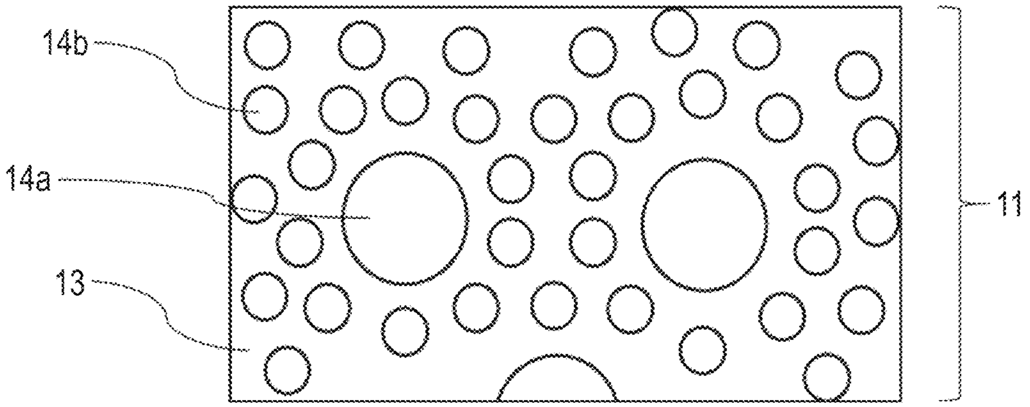
FIG. 11B is a schematic cross-sectional view illustrating a dispersion state of two types of inorganic fine particles contained in the first water repellent layer.

It is preferable that the average particle size of the inorganic fine particles 14 be as small as possible from the viewpoint that the rough-textured structure on the surface can be made less likely to collapse. It is particularly preferable that the average particle size be 20 nm or smaller. As illustrated in FIG. 11B, it is preferable that two types of inorganic fine particles 14 different in average particle size be dispersed in the water repellent resin. A combination of the two types of inorganic fine particles 14 different in average particle size may be a combination of R974 or Zircostar ZP-153 as larger fine particles 14*a* and R812 as smaller fine particles 14*b*.

In the case where the two types of the inorganic fine particles 14 different in average particle size are used, the two types of inorganic fine particles different in average particle size are more preferably such that the average particle size of the fine particles in one type (the larger fine particles 14*a*) is equal to or larger than 1.5 times the average particle size of the fine particles in the other type (the smaller fine particles 14*b*).

In the case where the two types of the inorganic fine particles 14 different in average particle size are used, a mixing ratio of the larger fine particles 14*a* to the smaller fine particles 14*b* may be 30:70 to 70:30 in terms of a mass ratio.

(First Water Repellent Resin 13)

The first water repellent resin 13 is not particularly limited in type, but has to have a water contact angle of 80° or more in order to function to impart the water repellency to the surface. Examples thereof include fluororesins such as PTFE (polytetrafluoroethylene), PFA (tetrafluoroethylene-perfluoroalkyl vinyl ether copolymer), FEP (tetrafluoroethylene-hexafluoropropylene copolymer (4.6 fluoride)), and ETFE (tetrafluoroethylene-ethylene copolymer).

As the first water repellent resin 13, a commercially available product may be used such, for example, as "product name: Lumiflon" (fluororesin, manufactured by AGC Inc.), "product name: Fluon PFA P-66P" (fluororesin, manufactured by AGC Inc.), and "product name: Neoflon FEPNP-30" (fluororesin, manufactured by Daikin Industries, Ltd.).

(First Water Repellent Resin Composition 18 and Preparation Method Thereof)

The first water repellent resin composition 18 contains the aforementioned first water repellent resin 13 and inorganic fine particles 14, and, if necessary, may contain a component such as polyethylene glycol in addition to a solvent such as PGMEA, xylene, polypropylene alcohol.

The first water repellent resin composition 18 may be prepared in any conventionally known method, and it is preferable to mix and stir the first water repellent resin 13 and the inorganic fine particles 14 at the same time. In this case, the ratio between the first water repellent resin 13 and the inorganic fine particles 14 is not particularly limited. If the ratio of the inorganic fine particles 14 is too high, when a physical stress such as friction is applied to the surface, the inorganic fine particles 14 make it difficult to diffuse the stress and decrease the durability. For this reason, it is preferable that the ratio of the inorganic fine particles 14 should not be too high. On the other hand, if the ratio of the inorganic fine particles 14 is too low, it is difficult to form rough texture on the surface and it is difficult to increase the water contact angle. As a result of earnest studies, the total mass of the inorganic fine particles 14 is most preferably 120 to 250% of the mass of the first water repellent resin 13.

<Second Water Repellent Layer 12>

The second water repellent layer 12 is formed of a cured product of the second water repellent resin composition 19 containing the second water repellent resin 15 and is provided directly below the first water repellent layer 11. When a stress such wiping is applied to the outermost surface of the first water repellent layer 11, the second water repellent layer 12 having appropriate flexibility incorporates some of the inorganic fine particles 14 contained in the first water repellent layer 11 and retains the rough-textured structure on the outermost surface of the first water repellent layer 11 as illustrated in FIG. 1B.

(Second Water Repellent Resin 15)

The second water repellent resin 15 is not particularly limited in type, but preferably has barrier properties capable of blocking permeation of a liquid such as an ink and flexibility that allows the second water repellent layer 12 to absorb some of the inorganic fine particles 14 contained in the first water repellent layer 11 when a stress is applied to the surface. From these two viewpoints, the second water repellent resin 15 has to be a resin having an appropriate hardness. Specifically, the second water repellent layer 12 formed of a cured product of the second water repellent resin composition 19 containing the second water repellent resin 15 has to have at least one of the following physical properties.

The flexural modulus is within a range of 3 to 7 GPa.

The hardness measured by nanoindentation is within a range of 0.18 to 0.30 GPa.

In addition, in order for the second water repellent layer 12 to easily exhibit the water repellency, the water contact angle of the second water repellent layer 12 is preferably 80° or more.

Representative examples of the second water repellent resin 15 include epoxy resins such as bisphenol A and F types, phenol novolac type, and cresol novolac type. In order to obtain the desired contact angle, a preferred example is: a mixture of a highly elastic resin such as an epoxy resin with a highly water repellent resin such as fluororesins such as PTFE (polytetrafluoroethylene), PFA (tetrafluoroethylene-perfluoroalkyl vinyl ether copolymer), FEP (tetrafluoroethylene-hexafluoropropylene copolymer (4.6 fluoride)), and ETFE (tetrafluoroethylene-ethylene copolymer) as well as silicone-based materials such as methylhydrogen silicone oil and dimethyl silicone oil; any of the aforementioned highly water repellent resins whose ends are modified with reactive groups such as epoxy groups (i.e. reactive group-containing resins or epoxy group-containing resins); or a mixture of a highly water repellent resin and a reactive group-containing resin which are crosslinked by a reaction within the layer to increase the flexural modulus.

As the first water repellent resin 13, a commercially available product may be used such, for example, as epoxy modified silicones "product name: X-22-343" (epoxy equivalent weight 525), and "product name: KF-101" (epoxy equivalent weight 350) both manufactured as Shin-Etsu Silicone, and a polycarbonate resin "product name: PC-GF20" (manufactured by Shinko Plastics Co., Ltd.).

The second water repellent resin composition 19 contains the second water repellent resin 15 and may contain optional components such as a photo-acid generator and a photo-base generator. The second water repellent resin composition 19 is prepared by any conventionally known method.

An epoxy group-containing resin not only has a flexural modulus high enough to impart proper flexibility necessary for the second water repellent layer 12 but also has a property capable of being crosslinked by heat with a highly water repellent resin. In addition, while a step of manufacturing a liquid ejection head requires heat resistance to withstand heating at 100° C. or higher, the epoxy group-containing resin has heat resistance to withstand such heating. Meanwhile, in order to block the permeation of the liquid, it is preferable to increase the density of the second water repellent layer 12. To increase the density, it is important to arrange the molecules regularly and it is desirable that the molecular weight of the second water repellent resin be as small as possible for the regular arrangement. The epoxy group-containing resin has a small molecular weight and is excellent in crosslinking with a highly water repellent resin.

From the above, the second water repellent resin 15 preferably contains one or more types of resins containing molecules having an epoxy group (hereinafter such resin will be referred to as an "epoxy resin").

When epoxy groups are introduced into the second water repellent layer 12 by using an epoxy resin as the second water repellent resin 15, it is preferable that the ratio of the epoxy groups to the molecules contained in the second water repellent layer 12 be sufficiently high for the purpose of sufficiently increasing the crosslinking density of the epoxy groups. From the viewpoint of ink resistance (suppression of a decrease in the adhesion), the epoxy equivalent weight of the epoxy resin is preferably equal to or smaller than 600. Moreover, the film thickness of the second water repellent layer 12 is desired to be within a proper range. If the film thickness is too small, the second water repellent layer 12 allows the liquid such as the ink to permeate into the entire second water repellent layer 12, and therefore tends to swell and decrease the adhesion after immersion in the liquid such as the ink. On the other hand, if the film thickness is too large, the second water repellent layer 12 tends to attenuate the light emitted during a photo-patterning process in the production of the liquid ejection head and decreases the sensitivity, resulting in poor adhesion in an initial state. Specifically, the film thickness is most preferably 1 to 4 μm.

<Layer Inserted Between Substrate 1 and Second Water Repellent Layer 12>

Between the substrate 1 and the second water repellent layer 12, another resin layer (hereinafter referred to as the lower resin layer 7) may be inserted. A resin used for the lower resin layer 7 (hereinafter referred to as the lower-layer resin 16) is not particularly limited as long as the substrate 1 and the second water repellent layer 12 can be bonded, but is particularly preferably an epoxy resin. The epoxy resin is particularly preferable because the epoxy resin can be cross-linked with epoxy groups, if contained in the second water repellent layer 12, by heating to strengthen the bonding between the lower resin layer 7 and the second water repellent layer 12.

The epoxy resin may be an epoxy resin such as bisphenol A and F types, phenol novolac type, and cresol novolac type, which are listed above as the examples for the second water repellent resin 15.

As the epoxy resin, a commercially available product may be used such, for example, as "product name: EHPE3150" (manufactured by Daicel Corporation), "product name: jER1007" (manufactured by Mitsubishi Chemical Corporation), and the like.

A lower-layer resin composition 20 contains the lower-layer resin 16 and may contain optional components such as a photo-acid generator, a silane agent, a solvent such as xylene, and a polyol compound.

The lower-layer resin composition 20 is prepared by any conventionally known method.

<Methods for Applying First Water Repellent Resin Composition 18, Second Water Repellent Resin Composition 19, and Lower-Layer Resin Composition 20>

Each of methods for applying the first water repellent resin composition 18, the second water repellent resin composition 19, and the lower-layer resin composition 20 is not particularly limited and any known method may be used. However, spin coating is preferable because of easiness of control to achieve uniform application with a desired film thickness. After each layer is applied, it is preferable to dry the layer thoroughly to prevent layers from being dissolved with each other.

Hereinafter, an embodiment in which the member having the specific layered structure is applied to a liquid ejection head 10 will be described specifically, but the present disclosure is not limited to the following embodiment. The following specific example is the embodiment in which the first water repellent layer 11 and second water repellent layer 12 are applied to a member for forming ejection orifices in the member 3 having the specific layered structure, while the lower resin layer 7 is applied to a member for forming a channel. The member for forming ejection orifices will be referred to as an ejection orifice forming member 3 and the member for forming a channel will be referred to as a channel forming member 6.

<Liquid Ejection Head>

Figure 2A:
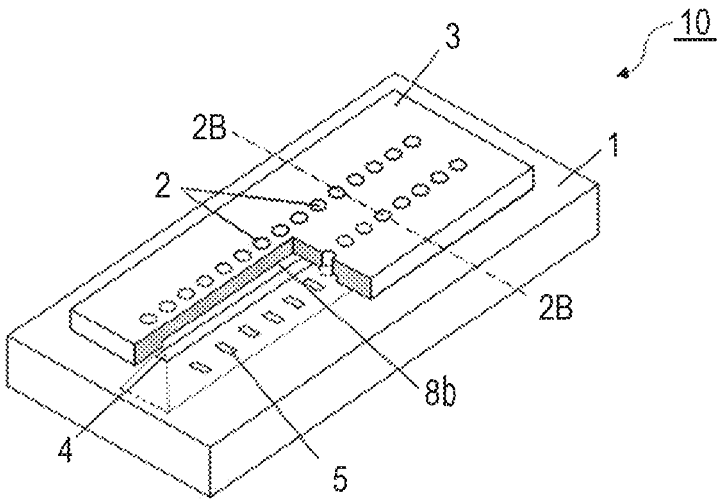
FIG. 2A is a schematic perspective view illustrating a structure of a liquid ejection head according to an embodiment of the present disclosure.
Figure 2B:
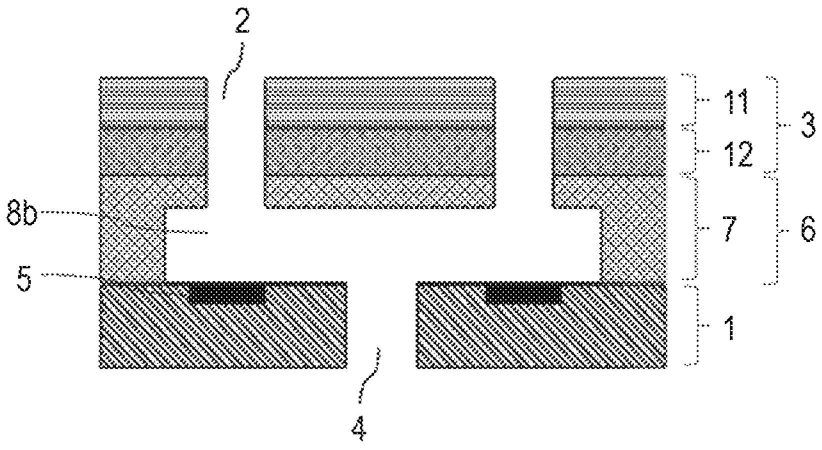
FIG. 2B is a schematic cross-sectional view taken along a 2B-2B line in FIG. 2A.

A structure of the liquid ejection head in the present disclosure will be described. FIG. 2A is a schematic perspective view illustrating an example of the liquid ejection head 10 according to the embodiment of the present disclosure. FIG. 2B is a schematic cross-sectional view of the liquid ejection head 10 according to the embodiment of the present disclosure as seen on a plane perpendicular to the substrate taken along a 2B-2B line in FIG. 2A.

The liquid ejection head 10 illustrated in FIG. 2A includes a substrate 1 in which energy generating elements 5 to generate energy for ejecting a liquid are formed at predetermined pitches in two arrays arranged side by side. The substrate 1 is, for example, a silicon substrate made of silicon. In the surface of the substrate 1, a supply port 4 passing through the substrate 1 is provided. If the substrate 1 is, for example, a silicon substrate, the substrate 1 is anisotropically etched to form the supply port 4. The supply port 4 is opened between the two arrays of the energy generating elements 5. Each of the energy generating elements 5 may be a heat generating resistor element or a piezoelectric element. On the substrate 1, the channel forming member 6 and the ejection orifice forming member 3 are formed. The channel forming member 6 forms side walls of a liquid channel 8*b* connecting the supply port 4 to be supplied with the liquid and ejection orifices 2 to eject the liquid. The ejection orifice forming member 3 is formed on the channel forming member 6 and the channel 8*b* and has the ejection orifices 2 to eject the liquid.

As described above, in the present embodiment, the first water repellent layer 11 and the second water repellent layer 12 constitute the ejection orifice forming member 3, while the lower resin layer 7 constitutes the channel forming member 6.

In the ejection orifice forming member 3, the ejection orifices 2 are formed at positions opposed to the energy generating elements 5 and are opened in an outermost surface of the ejection orifice forming member 3, that is, an outermost surface of the first water repellent layer 11. Terminals (not illustrated) are provided at both ends of the substrate 1, and an electric signal is transmitted through the terminals from the outside of the liquid ejection head 10 to the energy generating elements 5, and the energy generating elements 5 are driven in response to the electric signal. The liquid is supplied from the supply port 4 to liquid chambers (not illustrated) on the substrate 1 and is ejected from the ejection orifices 2 by receiving the energy from the energy generating elements 5 driven in the liquid chambers. The liquid ejected from the ejection orifices 2 are impacted on a print medium such as paper. In this way, characters and images are printed.

<Method for Producing Liquid Ejection Head>

Next, an example of a method for producing the above-described liquid ejection head will be described by using FIGS. 3A to 3H. FIGS. 3A to 3H are schematic cross-sectional views which illustrate an embodiment of the method for producing the liquid ejection head and which are taken along the same line as in FIG. 2B.

Figure 3A:
FIGS. 3A, 3B, 3C, 3D, 3E, 3F, 3G and 3H illustrate a series of steps for forming a layered structure illustrated in FIG. 2B.

As illustrated in FIG. 3A, the substrate 1 in which the energy generating elements 5 are provided on the surface is prepared. Such a substrate 1 functions as a part of a member that constitutes the channel 8*b* together with the channel forming member 6 to be described later. The substrate 1 is not particularly limited in shape, material, and so on, as long as the substrate 1 can function as a support for the ejection orifice forming member 3 and the channel forming member 6 to be described later. In the present embodiment, a silicon substrate 1 made of single crystal silicon is used in order to form the supply port 4 passing through the substrate 1 by anisotropic etching to be described later.

On the substrate 1, a desired number of energy generating elements 5 are arranged at predetermined pitches in two arrays arranged side by side.

In addition, various functional layers such as a protective layer (not illustrated) may be provided for the purpose of improving the durability of the energy generating elements 5.

Figure 3B:
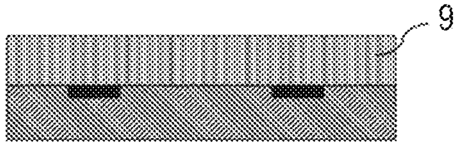

Next, as illustrated in FIG. 3B, a layer of a positive photosensitive resin (composition) 9 is formed on the substrate 1 including the energy generating elements 5 in order to form a pattern to serve as a mold for the channel 8*b*. The layer of the positive photosensitive resin 9 is preferably formed by spin coating. Examples of the positive photosensitive resin include a polymethyl isopropenyl ketone resin and a polymethyl methacrylate resin, which can be patterned with Deep UV, as well as other vinyl ketone resins, novolac resins, and so on. As the positive photosensitive resin 9, a commercially available product can be used such, for example, as polymethyl isopropenyl ketone "product name: ODUR-1010" (manufactured by TOKYO OHKA KOGYO CO., LTD.) and a vinyl ketone resin "product name: SOLBIN" (manufactured by Nissin Chemical Industry Co., Ltd.), and so on.

Figure 3C:
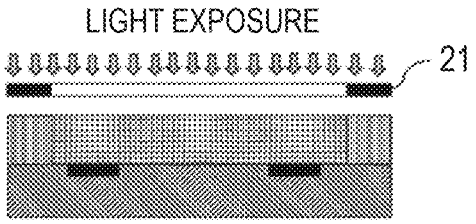
Figure 3D:
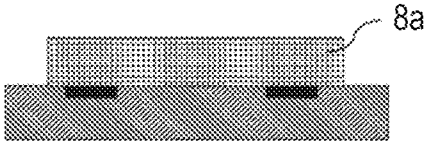

Next, as illustrated in FIG. 3C, the layer of the positive photosensitive resin 9 is patterned by light exposure through a channel forming mask 21. Then, as illustrated in FIG. 3D, a development process is performed to form a channel mold pattern 8*a*.

Figure 3E:
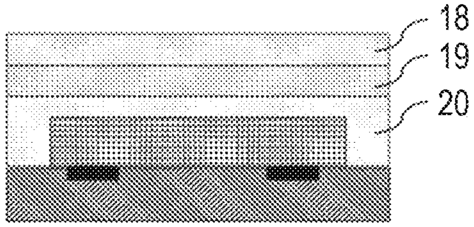

Subsequently, as illustrated in FIG. 3E, a layer of the lower-layer resin composition 20, a layer of the second water repellent resin composition 19, and a layer of the first water repellent resin composition 18 are formed in this order on the substrate 1 on which the channel mold pattern 8*a* is formed. The production method preferably includes a heating step after the lower resin layer 7 is formed and after the second water repellent resin composition 19 containing the second water repellent resin 15 is laminated on the lower resin layer 7, because the adhesion between the lower resin layer 7 and the second water repellent layer 12 can be enhanced.

The lower-layer resin composition 20, the second water repellent resin composition 19, and the first water repellent resin composition 18 are preferably applied by spin coating as described above.

Figure 3F:
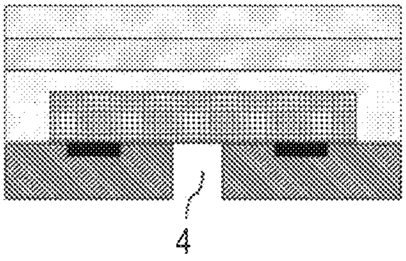

Next, as illustrated in FIG. 3F, the supply port 4 passing through the substrate 1 is formed by anisotropic etching.

Figure 3G:
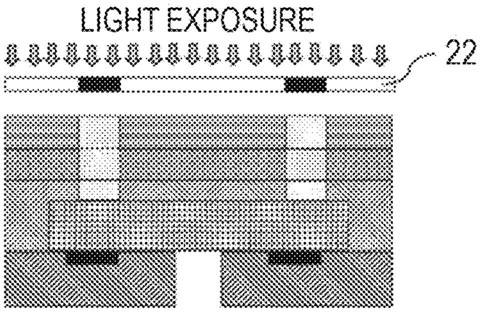

Then, as illustrated in FIG. 3G, the first water repellent layer 11 and the second water repellent layer 12 are patterned by light exposure through an ejection orifice forming mask 22.

Figure 3H:
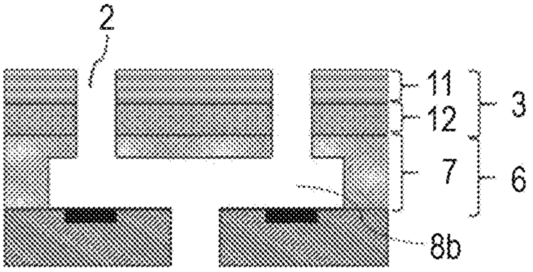

Finally, as illustrated in FIG. 3H, a development process is performed to form the channel forming member 6 and the ejection orifice forming member 3.

EXAMPLES

Hereinafter, Examples and Comparative Examples will be described, but the present disclosure is not limited to them. Evaluations were made including an evaluation of durability against ink by evaluating the adhesion between the second water repellent layer 12 and the lower resin layer 7 before and after immersion in an ink, and an evaluation of durability against wiping by measuring the water contact angle and the surface roughness of the outermost surface of the first water repellent layer 11 before and after wiping.

Example 1

<Preparation of Lower-Layer Resin Composition 20>

First, 100 g of an epoxy resin "product name: EHPE3150" (manufactured by Daicel Chemical Industries, Ltd.) was dissolved in 70 g of xylene, and the mixture was stirred for 3 days to dissolve the resin. After that, 5 g of a silane agent "product name: SILQUEST A-187" (manufactured by Momentive Performance Materials, Inc.) and 6 g of a photo-acid generator "product name: SP-172" (manufactured by ADEKA Corporation) were added to the obtained solution, and the mixture was stirred for 5 hours to prepare the lower-layer resin composition 20.

<Preparation of Second Water Repellent Resin Composition 19>

As the second water repellent resin 15, prepared was 100 g of a modified silicone "product name: X-22-343" (manufactured as Shin-Etsu Silicone, epoxy equivalent 525), which is a silicone oil with a side chain modified to an epoxy, represented by the following formula (1).

(1)

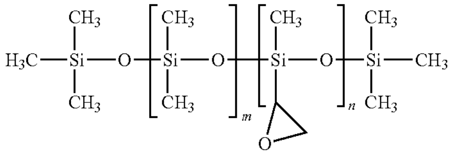

To 100 g of the modified silicone prepared above, 6 g of a photo-acid generator "product name: SP-172" (manufactured by ADEKA Corporation) was added to promote the epoxy reaction, and the mixture was stirred for 20 hours to prepare the second water repellent resin composition 19.

<Preparation of First Water Repellent Resin Composition 18>

As the first water repellent resin 13, a fluororesin "product name: Lumiflon (manufactured by AGC Corporation)", a fumed silica "product name: R974" (manufactured by NIPPON AEROSIL CO., LTD., particle size 12 nm), and a solvent PGMEA were prepared. These three materials were mixed in a mass ratio of 100:200:450, and the mixture was stirred for 2 minutes at 1200 rpm in a vacuum stirring/defoaming mixer to prepare the first water repellent resin composition 18.

<Preparation of Substrate 1 and Formation of Ink Channel Mold Pattern 8*a*>

As illustrated in FIG. 3A, the silicon substrate 1 provided with the energy generating elements 5 was prepared.

Next, as illustrated in FIG. 3B, as a positive resist to form a pattern for the ink channel, polymethyl isopropenyl ketone (ODUR-1010 manufactured by TOKYO OHKA KOGYO CO., LTD.) was applied in a film thickness of 14 μm on the silicon substrate 1. After the application, the resultant substrate was heat-treated at 120° C. for 6 minutes to form the layer of the positive photosensitive resin 9. As illustrated in FIG. 3C, subsequently, the layer of the positive photosensitive resin 9 was exposed to ultraviolet light through the channel forming mask 21 by an exposure apparatus UX3000 (manufactured by Ushio Inc.). Next, as illustrated in FIG. 3D, the resultant layer was developed with MIBK (methyl isobutyl ketone) to form the ink channel mold pattern 8*a* (positive resist).

<Formation of Film Layer of Lower-Layer Resin Composition 20>

As illustrated in FIG. 3E, the lower-layer resin composition 20 prepared above was applied in a film thickness of 20 μm onto the ink channel mold pattern 8*a* by spin coating, and then heat-treated at 60° C. for 3 minutes in a vacuum environment to form a film layer of the lower-layer resin composition 20.

<Formation of Film Layer of Second Water Repellent Resin Composition 19>

The second water repellent resin composition 19 prepared above was applied by spin coating in a film thickness of 1.5 μm onto the film layer of the lower-layer resin composition 20 previously formed, and then heat-treated at 60° C. for 3 minutes in a vacuum environment. Finally, the film layer on the substrate 1 was exposed to light at an exposure dose of 5000 $J/m^2$ using an i-line exposure stepper (manufactured by Canon Inc.), and then heat-treated at 95° C. for 180 seconds to promote the reaction and form the film layer of the second water repellent resin composition 19. Note that the flexural modulus was changed by changing the time for the heat treatment in this process.

<Formation of Film Layer of First Water Repellent Resin Composition 18>

The first water repellent resin composition 18 prepared above was applied in a film thickness of 1 μm onto the film layer of the second water repellent resin composition 19 by spin coating, and then heat-treated at 60° C. for 3 minutes in a vacuum environment to prepare a film layer of the first water repellent resin composition 18.

<Formation of Ink Supply Port>

As illustrated in FIG. 3F, a mask for forming the ink supply port 4 was appropriately placed on the back surface of the substrate 1. After the surface of the substrate 1 was protected with a rubber film, the ink supply port 4 was formed by anisotropically etching the substrate 1.

After completion of the anisotropic etching, the rubber film was removed from the substrate 1, and then the entire surface was exposed to ultraviolet light through the ejection orifice forming mask 22 by again using UX3000 (manufactured by Ushio, Inc.) as illustrated in FIG. 3G. As illustrated in FIG. 3H, the exposed areas were dissolved and removed using methyl lactate. The film layer of the lower-layer resin composition 20, the film layer of the second water repellent resin composition 19, and the film layer of the first water repellent resin composition 18 were completely cured. For the curing, a heating process was carried out at 200° C. for 1 hour, thereby forming the ejection orifice forming member 3 constituted by the first water repellent layer 11 and the second water repellent layer 12 and the channel forming member 6 constituted by the lower resin layer 7 on the substrate 1. After that, electrical connections and ink supply means were appropriately arranged to fabricate the liquid ejection head 10.

<Flexural Modulus and Hardness Evaluation of Second Water Repellent Layer>

The aforementioned second water repellent resin composition 19 was poured into a mold made of Teflon (registered trademark) and exposed to light at an exposure dose of 5000 $J/m^2$. Thereafter, the resultant composition was cured by the heat treatment under the same conditions as those in the heat treatment after the light exposure in Example 1 (95° C. and 180 seconds in the case of Example 1). After the curing, the cured product of the second water repellent resin composition 19 was taken out from the mold made of Teflon (registered trademark). The taken-out cured product was processed into a test piece (length 50 mm× width 40 mm×thickness 5 mm). While the obtained test piece was being compressed by a precision universal testing machine (product name: AG-IS) (manufactured by Shimadzu Corporation), the relationship between the stress and the strain was measured and thereby the flexural modulus (GPa) of the second water repellent layer 12 was calculated.

Regarding the hardness of the second water repellent layer 12, the hardness of the second water repellent layer 12 in the aforementioned inkjet head form was measured according to the following procedure.

First, the first water repellent layer 11 was removed by grinding with a blade to expose the second water repellent layer 12 on the surface layer. Thereafter, using a nanoindenter "product name: TI950 TriboIndenter" (manufactured by Hysitron Inc.), a surface load and a contact depth were measured to calculate the hardness of the surface of the second water repellent layer 12, and the calculated hardness was used as the hardness of the second water repellent layer 12.

<Relationship Between Heating Time and Flexural Modulus and Hardness of Second Water Repellent Layer 12>

Figure 4A:
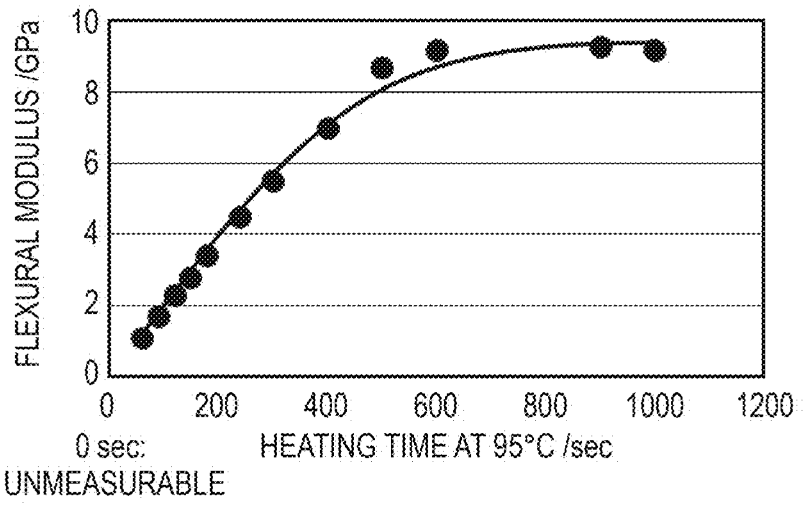
FIG. 4A is a graph presenting a relationship between a heating time after preparation of a second water repellent resin composition and a flexural modulus.

FIG. 4A presents a result of measuring a relationship between the heating time (Sec) at 95° C. and the flexural modulus (GPa) measured in the above method. From this result, since the flexural modulus changed linearly as the heating time became longer, it was confirmed that the flexural modulus can be adjusted by using the heating time. Here, the flexural modulus remained at an almost constant value after the heating time was extended to or beyond a certain point. This is presumably because all the epoxy groups contained in the second water repellent layer had completely reacted.

Figure 4B:
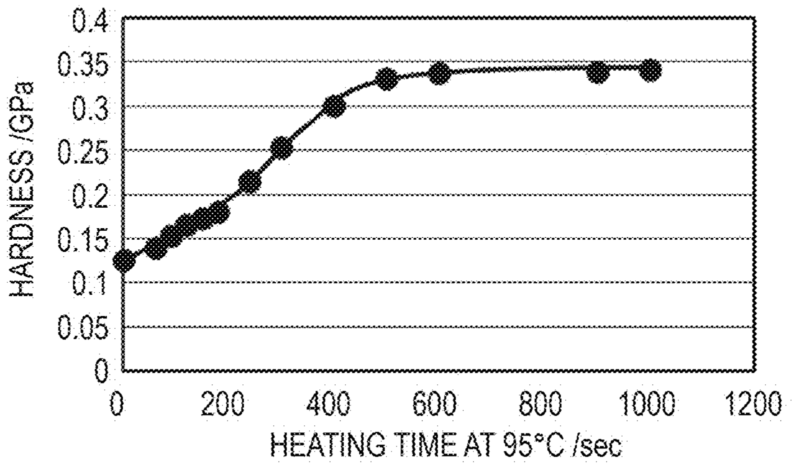
FIG. 4B is a graph presenting a relationship between the heating time after the preparation of the second water repellent resin composition and a surface hardness.

FIG. 4B presents a result of measuring a relationship between the heating time (Sec) at 95° C. and the hardness of the surface of the second water repellent layer measured by the nanoindenter in the above method. From this result, it was observed that the hardness of the surface of the second water repellent layer 12 also increased and eventually remained constant as the heating time was extended as in the case of the flexural modulus.

<Evaluation of Adhesion (Shear Strength)>

Figure 5:
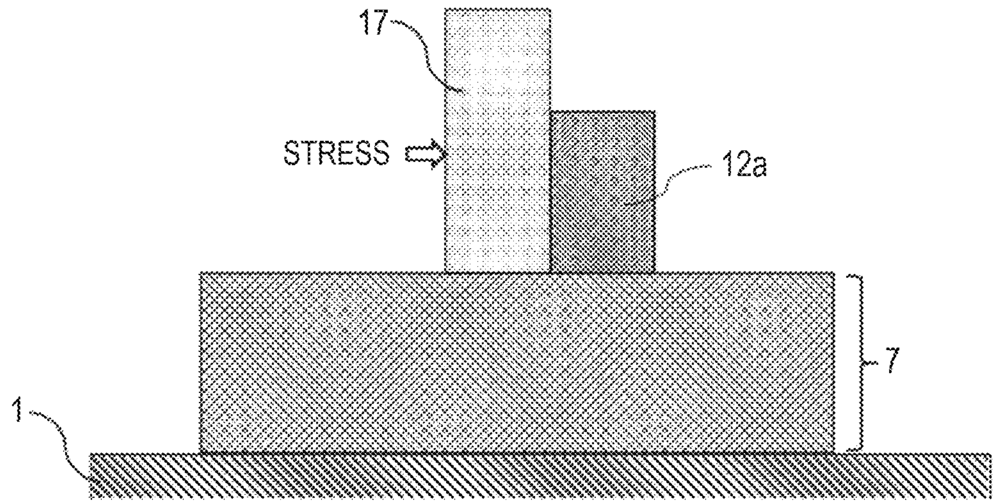
FIG. 5 is a schematic diagram illustrating a shear strength measurement method.

The adhesion between the lower resin layer 7 (the channel forming member 6) and the second water repellent layer 12 (the ejection orifice forming member 3) was measured according to the following procedure. First, as illustrated in FIG. 5, a pattern 12*a* of the second water repellent layer 12 is formed on the substrate 1 covered with the lower resin layer 7, and the pattern **12*a* was pressed by a tool 17**.

While the pressing force was being gradually increased, the value of the pressing force at which the pattern **12*a* was detached was measured to evaluate the adhesion. The value of the pressing force at which the pattern 12*a* was detached is referred to as a "shear strength" and indicates that the larger this value, the stronger the adhesion between the lower resin layer 7 and the second water repellent layer 12**. The above adhesion evaluation was performed before and after immersion in an ink. The immersion in the ink was performed according to the following method.

<Immersion in Ink>

A laminate in which the pattern **12*a* of the second water repellent layer 12 was formed on the substrate 1 covered with the lower resin layer 7** was immersed in the ink specified below in Table 1 and was left in an oven at 70° C. for 90 days. Here, carbon black was used as a black pigment.

TABLE 1

| Ink Components | |
|---|---|
| Components | Parts by Mass |
| Diethylene Glycol | 10.0 |
| 2-Pyrrolidone | 30.0 |
| 1,2-Hexanediol | 7.0 |
| Acetylenol | 1.0 |
| Black Pigment | 3.0 |
| Pure Water | 49.0 |

<Measurement of Water Contact Angle and Evaluation of Water Repellency>

The water repellency of the outermost surface of the liquid ejection head 10 (the outermost surface of the first water repellent layer 11) and water repellent resin samples was evaluated by measuring a dynamic receding contact angle θr with pure water was measured by use of a micro-contact angle meter (product name: "DropMeasure" manufactured by Microjet Corporation). The measurement method includes dropping water onto the outermost surface of the first water repellent layer 11 or each of the water repellent resin samples to be described below by using an automatic dispenser, photographing an angle between the outermost surface and the droplet during gradual shrinkage with a camera equipped in the meter, and obtaining the dynamic receding contact angle θr by calculation. The larger the value of the dynamic receding contact angle θr, the higher the water repellency. The above water repellency evaluation was performed before and after a wipe test. The wipe test was performed according to the following method.

<Preparation of Water Repellent Resin Samples for Contact Angle Measurement>

Water repellent resin samples for measuring the water contact angles of the first water repellent resin 13 and the second water repellent resin 15 were prepared according to the following procedure.

The first water repellent resin 13 was poured into a mold made of Teflon (registered trademark), and then heat-treated at 60° C. for 3 minutes in a vacuum environment to cure the first water repellent resin 13, thereby obtaining a first water repellent resin sample.

Next, the second water repellent resin composition 19 prepared above was poured into a mold made of Teflon (registered trademark), and then exposed to light at an exposure dose of 5000 J/m$^2$. After that, the second water repellent resin composition 19 was cured by the heat treatment under the same conditions as those in the heat treatment after the light exposure in Example 1 (95° C. and 180 seconds in the case of Example 1), thereby obtaining a second water repellent resin sample. In the case of Example 5 to be described later, a polycarbonate resin "product name: PC-GF20" (manufactured by Shinko Plastics Co., Ltd.) as the second water repellent resin 15 was once heated to a temperature of 200° C. to reduce the viscosity.

After that, the resultant resin was poured into a mold made of Teflon (registered trademark) to obtain a second water repellent resin sample.

<Wipe Test>

A diamond tip with a tip end diameter of 15 μm was prepared as a wiping tool. The pressing load between the wiping tool and the outermost surface of the liquid ejection head 10 (the first water repellent layer 11) was set to 10 gf. Then, the outermost surface of the liquid ejection head 10 (the first water repellent layer 11) was rubbed back and forth in 10 cycles by the wiping tool.

<Measurement of Surface Roughness Ra>

A structure of the outermost surface of the liquid ejection head 10 (the first water repellent layer 11) was observed with a laser scanning microscope "product name: VK-9700" (manufactured by KEYENCE CORPORATION). At the same time, the waviness of the outermost surface was calculated using the above microscope, and thereby the surface roughness Ra of the outermost surface was calculated. The above measurement of the surface roughness Ra was performed before and after the wipe test described above.

Example 2

Example 2 was carried out under the same conditions as in Example 1 except that the heating time after the light exposure in the formation of the second water repellent layer 12 was changed to 240 seconds.

Example 3

Example 3 was carried out under the same conditions as in Example 1 except that the heating time after the light exposure in the formation of the second water repellent layer 12 was changed to 300 seconds.

Example 4

Example 4 was carried out under the same conditions as in Example 1 except that the heating time after the light exposure in the formation of the second water repellent layer 12 was changed to 400 seconds.

Example 5

In the formation of the second water repellent layer 12, a polycarbonate resin having a flexural modulus of 5.4 GPa "product name: PC-GF20" (manufactured by Shinko Plastics Co., Ltd.) was prepared as the second water repellent resin 15. This resin was heated once to a temperature at 200° C. to reduce the viscosity, and then was applied in a film thickness of 1.5 μm onto the film layer of the lower-layer resin 16 by spin coating. Except for the above, Example 5 was carried out under the same conditions as in Example 1. As the flexural modulus of the second water repellent layer 12, the value specified for the commercially available product is cited as it is, and the hardness was not measured.

Example 6

Example 6 was carried out under the same conditions as in Example 1 except that, in the formation of the second water repellent layer 12, the type of the second water repellent resin 15 was changed to a modified silicone "product name: KF-101" (manufactured as Shin-Etsu Silicone, epoxy equivalent weight 350) and the heating time after the light exposure was changed to 220 seconds.

Example 7

Example 7 was carried out under the same conditions as in Example 1 except that, in the formation of the second water repellent layer 12, the type of the second water repellent resin 15 was changed to a modified silicone "product name: KF-1001" (manufactured as Shin-Etsu Silicone, epoxy equivalent weight 3500) and the heating time after the light exposure was changed to 950 seconds.

Example 8

In the formation of the lower resin layer 7, a polycarbonate resin having a flexural modulus of 5.4 GPa "product name: PC-GF20" (manufactured by Shinko Plastics Co., Ltd.) was prepared as the lower-layer resin 16. This resin was heated once to a temperature at 200° C. to reduce the viscosity. After that, the resin having the reduced viscosity was applied in a film thickness of 20 μm onto the substrate 1 by spin coating. In the formation of the second water repellent layer 12, the heating time after the light exposure was changed to 300 seconds. Except for these, Example 8 was carried out under the same conditions as in Example 1.

Example 9

In the formation of the first water repellent layer 11, the inorganic fine particles 14 were changed to a mixture of fumed silica "product name: R976" (manufactured by NIPPON AEROSIL CO., LTD., particle size 12 nm) and fumed silica "product name: R812" (manufactured by NIPPON AEROSIL CO., LTD., particle size 7 nm) in a mass ratio of 1:1. In addition, in the formation of the second water repellent layer 12, the heating time after the light exposure was changed to 300. Except for these, Example 9 was carried out under the same conditions as in Example 1.

Example 10

Example 10 was carried out under the same conditions as in Example 1 except that the film thickness of the second water repellent layer 12 was changed to 0.5 μm.

Example 11

Example 11 was carried out under the same conditions as in Example 1 except that the film thickness of the second water repellent layer 12 was changed to 2.5 μm.

Example 12

Example 12 was carried out under the same conditions as in Example 1 except that the film thickness of the second water repellent layer 12 was changed to 4 μm.

Example 13

Example 13 was carried out under the same conditions as in Example 1 except that the film thickness of the second water repellent layer 12 was changed to 6 μm.

Comparative Example 1

Comparative Example 1 was carried out under the same conditions as in Example 1 except that the heating time after the light exposure in the formation of the second water repellent layer 12 was changed to 60 seconds.

Comparative Example 2

Comparative Example 2 was carried out under the same conditions as in Example 1 except that the heating time after the light exposure in the formation of the second water repellent layer 12 was changed to 90 seconds.

Comparative Example 3

Comparative Example 3 was carried out under the same conditions as in Example 1 except that the heating time after the light exposure in the formation of the second water repellent layer 12 was changed to 120 seconds.

Comparative Example 4

Comparative Example 4 was carried out under the same conditions as in Example 1 except that the heating time after the light exposure in the formation of the second water repellent layer 12 was changed to 150 seconds.

Comparative Example 5

Comparative Example 5 was carried out under the same conditions as in Example 1 except that the heating time after the light exposure in the formation of the second water repellent layer 12 was changed to 500 seconds.

Tables 2-1 to 2-3 summarize the evaluation conditions, items, and results in Examples and Comparative Examples described above.

TABLE 2-1

| | | Ex. 1 | Ex. 2 | Ex. 3 | Ex. 4 | Ex. 5 | Ex. 6 | Ex. 7 |
|---|---|---|---|---|---|---|---|---|
| First Water Repellent Layer | First Water Repellent Resin | PTTE | ← | ← | ← | ← | ← | ← |
| | Inorganic Fine Particles | Fumed Silica Average Particle Size 12 nm | ← | ← | ← | ← | ← | ← |
| | Resin Contact Angle (°) | 94 | ← | ← | ← | ← | ← | ← |

TABLE 2-1-continued

| | | Ex. 1 | Ex. 2 | Ex. 3 | Ex. 4 | Ex. 5 | Ex. 6 | Ex. 7 |
|---|---|---|---|---|---|---|---|---|
| Second Water Repellent Layer | Second Water Repellent Resin | Modified Silicone Oil with Epoxy Group Terminal | ← | ← | ← | Polycarbonate | Modified Silicone Oil with Epoxy Group Terminal | ← |
| | Epoxy Equivalent Weight | 525 | ← | ← | ← | ← | 350 | 3500 |
| | Resin Contact Angle (*) | 88 | | | | 86 | 88 | ← |
| | Heating Time (Sec) | 180 | 240 | 300 | 400 | ← | 220 | 950 |
| | Flexural Modulus (Gpa) | 3.4 | 4.5 | 5.5 | 7.0 | 5.4 | 5.6 | 5.4 |
| | Hardness (Gpa) | 0.180 | 0.215 | 0.253 | 0.300 | n.a. (about 0.2 in general) | 0.261 | 0.240 |
| | Film Thickness | 1.5 | ← | ← | ← | ← | ← | ← |
| Lower Resin Layer | Resin | Epoxy Resin | ← | ← | ← | ← | ← | ← |
| Contact Angle (°) | Initial | 97 | 98 | 97 | 97 | 98 | 97 | 97 |
| | After Immersion in Ink | 93 | 92 | 92 | 90 | 92 | 93 | 92 |
| Adhesion (Shear Strength (Mpa)) | Initial | 43 | 44 | 44 | 44 | 43 | 45 | 42 |
| | After Immersion in Ink | 40 | 40 | 41 | 41 | 37 | 42 | 37 |
| Surface Roughness (Ra) | Initial | 0.35 | 0.35 | 0.34 | 0.35 | 0.34 | 0.35 | 0.34 |
| | After Immersion in Ink | 0.38 | 0.39 | 0.39 | 0.41 | 0.39 | 0.39 | 0.39 |

TABLE 2-2

| | | Ex. 8 | Ex. 9 | Ex. 10 | Ex. 11 | Ex. 12 | Ex. 13 |
|---|---|---|---|---|---|---|---|
| First Water | First Water Repellent Resin | PTTE | ← | ← | ← | ← | ← |
| Repellent Layer | Inorganic Fine Particles | Fumed Silica Average Particle Size 12 nm | 2 Types of Fumed Silica Average Particle Size 7 nm and 12 nm | Fumed Silica Average Particle Size 12 nm | ← | ← | ← |
| | Resin Contact Angle (°) | 94 | ← | ← | ← | ← | ← |
| Second Water | Second Water Repellent Resin | Modified Silicone Oil with Epoxy Group Terminal | ← | ← | ← | ← | ← |
| Repellent Layer | Epoxy Equivalent Weight | 525 | ← | ← | ← | ← | ← |
| | Resin Contact Angle (°) | 88 | ← | ← | ← | ← | ← |
| | Heating Time (Sec) | 300 | ← | ← | ← | ← | ← |
| | Flexural Modulus (Gpa) | 5.5 | ← | ← | ← | ← | ← |
| | Hardness (Gpa) | 0.253 | ← | ← | ← | ← | ← |
| | Film Thickness | 1.5 | ← | 0.5 | 2.5 | 4 | 6 |
| Lower Resin Layer | Resin | Polycarbonate | Epoxy Resin | ← | ← | ← | ← |
| Contact Angle (°) | Initial | 97 | 98 | 98 | 96 | 97 | 97 |
| | After Immersion in Ink | 92 | 96 | 92 | 93 | 92 | 93 |
| Adhesion (Shear Strength (Mpa)) | Initial | 36 | 44 | 46 | 43 | 42 | 37 |
| | After Immersion in Ink | 29 | 40 | 34 | 41 | 39 | 31 |
| Surface Roughness (Ra) | Initial | 0.35 | 0.36 | 0.35 | 0.34 | 0.34 | 0.34 |
| | After Immersion in Ink | 0.40 | 0.36 | 0.38 | 0.38 | 0.37 | 0.37 |

TABLE 2-3

| | | Comp. Ex. 1 | Comp. Ex. 2 | Comp. Ex. 3 | Comp. Ex. 4 | Comp. Ex. 5 |
|---|---|---|---|---|---|---|
| First Water | First Water Repellent Resin | PTTE | ← | ← | ← | ← |
| Repellent Layer | Inorganic Fine Particles | Fumed Silica Average Particle Size 12 nm | ← | ← | ← | ← |
| | Resin Contact Angle (°) | 94 | ← | ← | ← | ← |
| Second Water | Second Water Repellent Resin | Modified Silicone Oil with Epoxy Group Terminal | ← | ← | ← | ← |
| Repellent Layer | Epoxy Equivalent Weight | 525 | ← | ← | ← | ← |
| | Resin Contact Angle (°) | 88 | ← | ← | ← | ← |
| | Heating Time (Sec) | 60 | 90 | 120 | 150 | 500 |
| | Flexural Modulus (Gpa) | 1.1 | 1.7 | 2.3 | 2.8 | 8.7 |
| | Hardness (Gpa) | 0.139 | 0.153 | 0.66 | 0.173 | 0.331 |
| | Film Thickness | 1.5 | ← | ← | ← | ← |

TABLE 2-3-continued

| | | Comp. Ex. 1 | Comp. Ex. 2 | Comp. Ex. 3 | Comp. Ex. 4 | Comp. Ex. 5 |
|---|---|---|---|---|---|---|
| Lower Resin Layer | Resin | Epoxy Resin | ← | ← | ← | ← |
| Contact Angle (°) | Initial | 96 | 96 | 97 | 97 | 97 |
| | After Immersion in Ink | 93 | 93 | 93 | 92 | 84 |
| Adhesion (Shear | Initial | 33 | 38 | 42 | 43 | 44 |
| Strength (Mpa)) | After Immersion in Ink | 21 | 30 | 36 | 39 | 42 |
| Surface Roughness | Initial | 0.35 | 0.34 | 0.35 | 0.34 | 0.34 |
| (Ra) | After Immersion in Ink | 0.38 | 0.37 | 0.38 | 0.38 | 0.53 |

<Evaluation Results>

(Adhesion)

Figure 6:
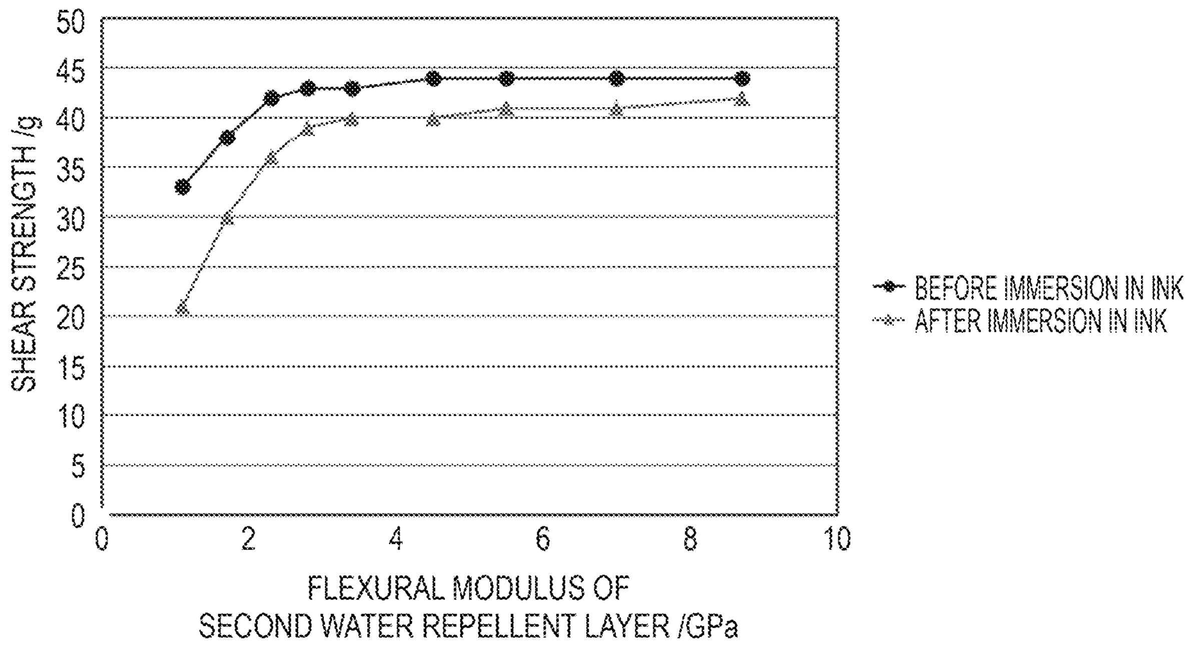
FIG. 6 is a graph presenting a relationship between the flexural modulus of the second water repellent layer and the adhesion between the second water repellent layer and the lower resin layer.

FIG. 6 presents results of measuring the shear strength before and after the immersion in the ink in the cases where the second water repellent layer 12 had different flexural moduli by comparing Examples 1 to 4 and Comparative Examples 1 to 5. From these results, it was confirmed that the decrease in the shear strength due to the immersion in the ink became smaller as the flexural modulus increased, and that the shear strength became almost constant when the flexural modulus was 2.8 GPa or higher and the hardness measured by the nanoindentation testing was 0.173 GPa or higher. This is presumably because, with the increase in the flexural modulus, the second water repellent layer was increased in density and less likely to swell due to the immersion in the ink.

Figure 7:
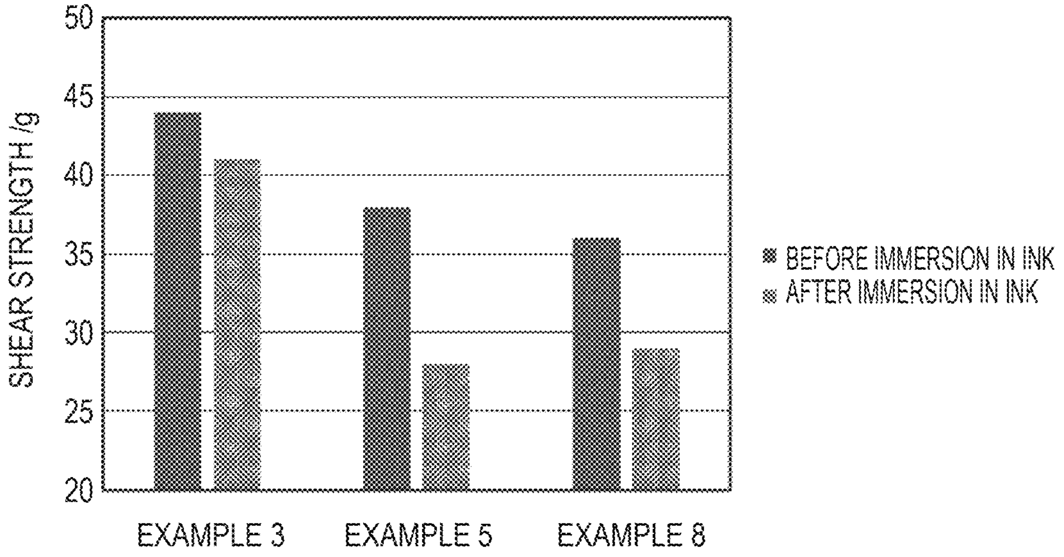
FIG. 7 is a graph presenting a relationship between the compositions of the second water repellent layer and the lower resin layer and the adhesion between the second water repellent layer and the lower resin layer.

Next, FIG. 7 presents results of measuring the shear strength before and after the immersion in the ink in Examples 3, 5, and 8 that are almost the same in terms of the flexural modulus of the second water repellent layer 12 and are different in terms of the main components in the second water repellent layer 12 and the lower resin layer 7 as specified in Table 3 below.

TABLE 3

| Evaluation Criteria for Difference in Resin Types | | | |
|---|---|---|---|
| Number | Ex. 3 | Ex. 5 | Ex. 8 |
| Main Component of Second Water Repellent Layer | Epoxy Resin | Poly-carbonate | Epoxy Resin |
| Main Component of Lower Layer Resin | Epoxy Resin | Epoxy Resin | Poly-carbonate |

From FIG. 7, it was confirmed that in the case where both the second water repellent layer 12 and the lower resin layer 7 contained epoxy groups, the adhesion was improved in both states before and after the immersion in the ink. This is presumably because both the second water repellent layer 12 and the lower resin layer 7 contain the epoxy groups, causing the epoxy groups in these two layers to react with each other and form bonds.

Figure 8:
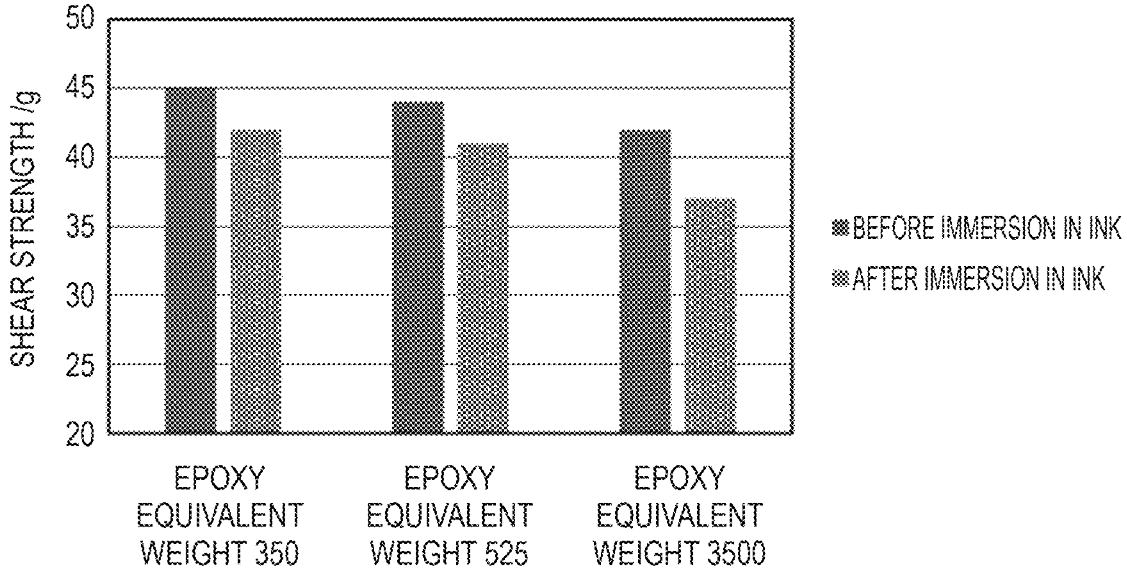
FIG. 8 is a graph presenting a relationship between an epoxy equivalent weight of the resin constituting the second water repellent layer and the adhesion between the second water repellent layer and the lower resin layer.

Further, Examples 3, 6, and 7 were compared to measure a relationship between the epoxy equivalent weight and the adhesion in the case where the flexural modulus is the same. FIG. 8 presents the results. From the results in FIG. 8, it was confirmed that the adhesion after the immersion in the ink decreased in the case where the epoxy equivalent weight was increased to 3500 as compared with the case where the epoxy equivalent weight was 300 to 525. This is presumably because a smaller total amount of epoxy groups makes bonding points less dense, which makes it easier for the ink to permeate.

Figure 9:
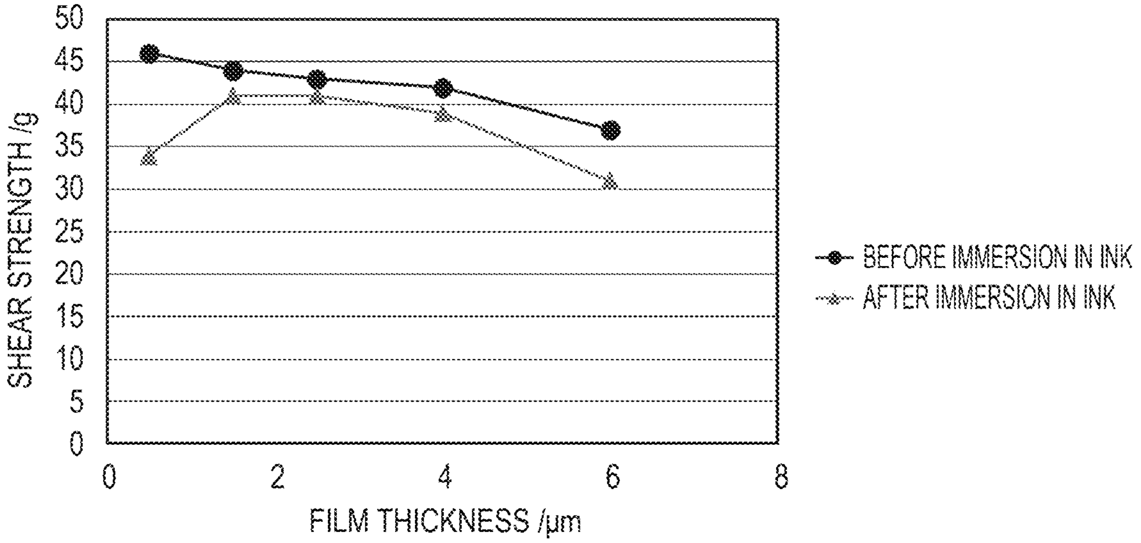
FIG. 9 is a graph presenting a relationship between a film thickness of the second water repellent layer and the adhesion between the second water repellent layer and the lower resin layer.

Lastly, Examples 3, 10, 11, 12, and 13 were compared to measure a relationship between the film thickness and the adhesion. FIG. 9 presents the results. From the results in FIG. 9, it was confirmed that the adhesion after the immersion in the ink was low when the film thickness was too small, and that the adhesion in the initial state was low when the film thickness was too large. This is presumably because the second water repellent layer 12 having too small a film thickness allows the ink to permeate into the entire second water repellent layer 12, and therefore tends to swell and decrease the adhesion after the immersion in the ink, while the second water repellent layer 12 having too large a film thickness forms epoxy-epoxy bonds at such a low density that the adhesion in the initial state is poor. The range of the film thickness that can achieve the adhesion in both states before and after the immersion in the ink is estimated to be 1 to 4 μm.

(Contact Angle)

Figure 10:
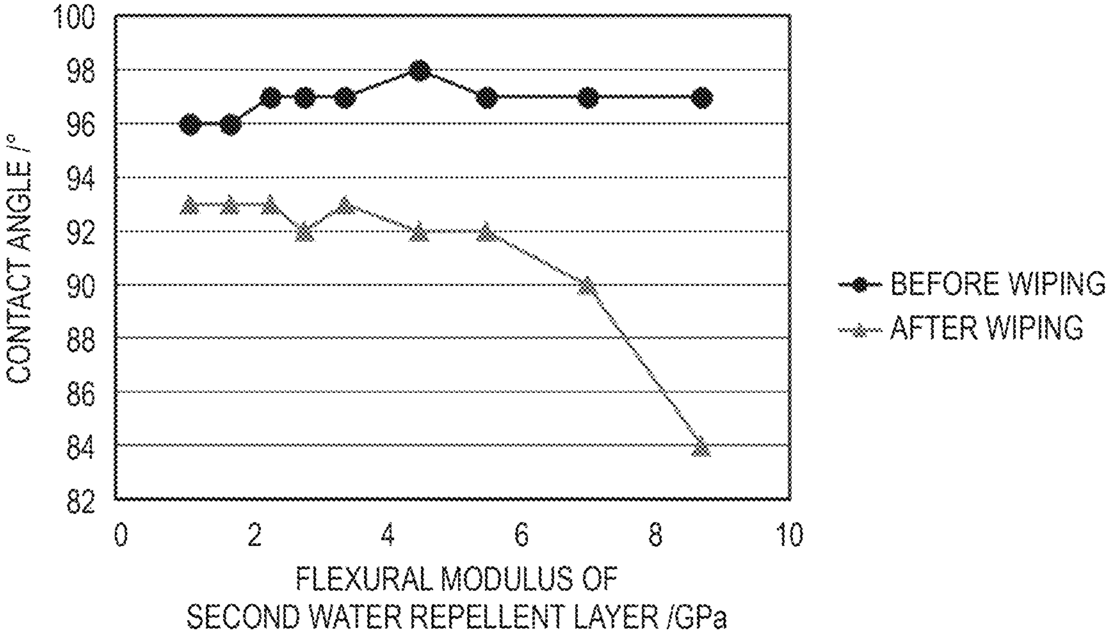
FIG. 10 is a graph presenting a relationship between the flexural modulus of the second water repellent layer and a water contact angle of the outermost surface of a first water repellent layer.

FIG. 10 presents results of measuring contact angles before and after wiping in the cases where the second water repellent layer 12 has the different flexural moduli by comparing Examples 1 to 4 and Comparative Examples 1 to 5. From the results, when the flexural modulus was 7 GPa or lower and the hardness measured by the nanoindentation test was 0.300 GPa or lower, the decrease in the contact angle before and after the wiping was kept within about 5°. However, when the flexural modulus was increased to 8.7 GPa and the hardness measured by the nanoindentation test was increased to 0.331 GPa, the decrease from the contact angle before the wiping to the contact angle after the wiping was 13°. This is presumably because the second water repellent layer 12 having too high a flexural modulus has such a low flexibility that the layer 12 cannot incorporate the inorganic fine particles contained in the first water repellent layer 11 when a stress is applied to the outermost layer of the first water repellent layer 11 by wiping. This results in a lower shape retention ability and a collapse of the rough-textured structure, so that the contact angle is decreased.

Subsequently, Examples 3 and 9 were compared to obtain a relationship between a particle composition of the inorganic fine particles 14 contained in the first water repellent layer 11 and the water contact angle of the first water repellent layer 11. FIG. 11A presents these results. From the results in FIG. 11A, it was confirmed that the existence of the two types of inorganic fine particles different in average particle size in the first water repellent layer 11 resulted in nearly the same contact angle before the wiping but reduced the decrease in the contact angle after the wiping. The present inventor considers this reason as follows.

FIG. 11B is a schematic cross-sectional view in the case where the inorganic fine particles 14 in the first water repellent layer 11 are of two types of inorganic fine particles 14 different in average particle size, the view illustrating a distribution state of the two types of the inorganic fine particles 14. As illustrated in FIG. 11B, inorganic fine particles 14*b* with a smaller average particle size surround inorganic fine particles 14*a* with a larger average particle size, reducing a range in which the particles can move (free volume). As a result, the inorganic fine particles 14*a* with the larger average particle size are less likely to move even when being wiped, making it easier to retain the structure.

(Surface Roughness)

Figure 12:
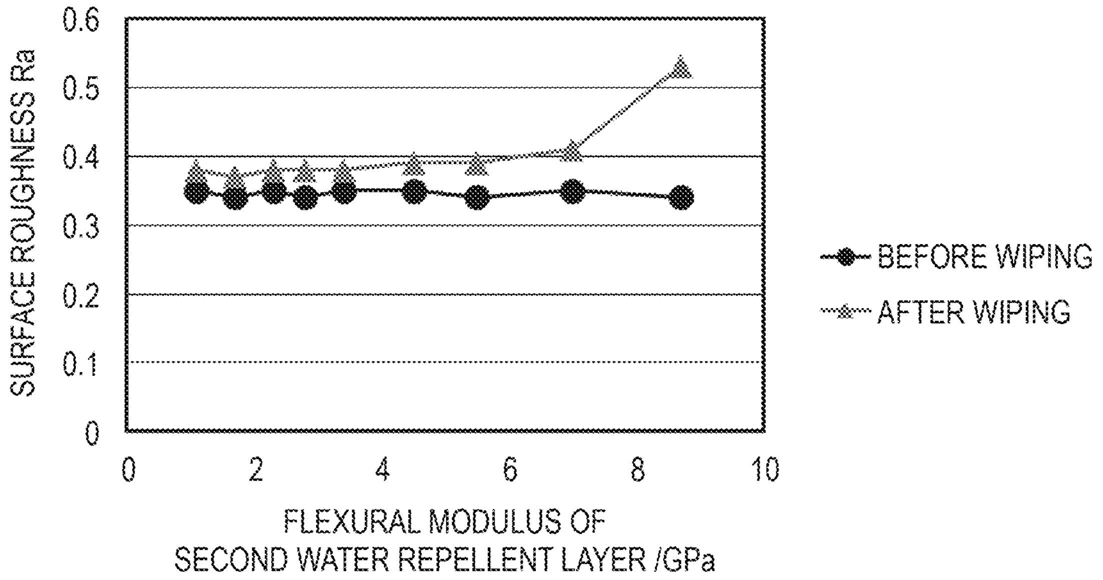
FIG. 12 is a graph presenting a relationship between the flexural modulus of the second water repellent layer and a surface roughness Ra of the outermost surface of the first water repellent layer.

FIG. 12 presents results of measuring the surface roughness Ra before and after wiping in the cases where the second water repellent layer 12 has the different flexural moduli by comparing Examples 1 to 4 and Comparative Examples 1 to 5. As a result, when the flexural modulus was 7 GPa or lower and the hardness measured by the nanoindentation test was 0.300 GPa or lower, the increase in the surface roughness Ra before and after the wiping was kept within about 0.04. However, when the flexural modulus was increased to 8.7 GPa and the hardness measured by the nanoindentation test was increased to 0.331 GPa, the increase from the surface roughness Ra before the wiping to the surface roughness Ra after the wiping was 0.19. Presumably, this change in the surface roughness Ra has a correlation with the change in the contact angle and means that the second water repellent layer 12 having too high a flexural modulus deteriorated in cushioning properties and had difficulty in absorbing the inorganic fine particles 14 contained in the first water repellent layer 11, which lowered the shape retention ability.

Figure 13:
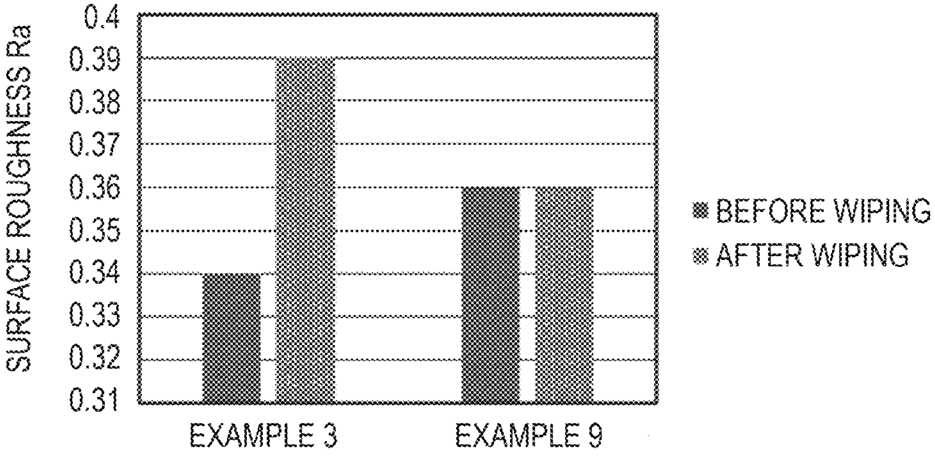
FIG. 13 is a graph presenting a relationship between types of inorganic fine particles contained in the first water repellent layer and the surface roughness Ra of the outermost surface of the first water repellent layer.

Similarly, Examples 3 and 9 were compared to obtain a relationship between the particle composition contained in the first water repellent layer 11 and the surface roughness Ra. FIG. 13 presents these results. From the results, it was confirmed that the existence of the two types of inorganic fine particles different in average particle size in the first water repellent layer 11 further decreased the increase in the surface roughness Ra by wiping. These results also mean that the inorganic fine particles 14*b* with the smaller average particle size surround the inorganic fine particles 14*a* with the larger average particle size, reducing the range in which the particles can move and enhancing the shape stability.

According to the present disclosure, it is possible to provide a liquid ejection head capable of suppressing ink permeation into resins while keeping water repellency of an outermost surface even under a stress such as wiping.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-187916, filed Nov. 1, 2023, which is hereby incorporated by reference herein in its entirety.

What is claimed is:

1. A liquid ejection head comprising a substrate, and a member provided on the substrate, the member having an ejection orifice formed therein to eject a liquid, wherein the member is formed of a water repellent layer having a multilayer structure, the water repellent layer including:

a first water repellent layer, as an outermost layer, having a water contact angle of 80° or more, which is formed of a cured product of a first water repellent resin composition comprising a first water repellent resin and inorganic fine particles dispersed therein; and a second water repellent layer, as provided directly below the first water repellent layer, having a flexural modulus of 3 to 7 GPa or a hardness of 0.18 to 0.30 GPa, which is formed of a cured product of a second water repellent resin composition comprising a second water repellent resin.

2. The liquid ejection head according to claim 1, wherein the second water repellent resin includes at least one resin containing a molecule having an epoxy group.

3. The liquid ejection head according to claim 1, further comprising a lower resin layer provided between the second water repellent layer and the substrate, which is formed of a resin containing a molecule having an epoxy group.

4. The liquid ejection head according to claim 1, wherein the inorganic fine particles include two types of fine particles having different average particle sizes, one of which is equal to or larger than 1.5 times the other.

5. The liquid ejection head according to claim 1, wherein the second water repellent layer has a film thickness of 1 to 4 μm.

6. The liquid ejection head according to claim 2, wherein the resin containing a molecule having an epoxy group has an epoxy equivalent weight equal to or smaller than 600.

7. The liquid ejection head according to claim 1, wherein a total mass of the inorganic fine particles is 120 to 250% of a mass of the first water repellent resin.

8. A method for producing a liquid ejection head comprising a substrate and a member provided on the substrate, the member having an ejection orifice formed therein to eject a liquid, the member being formed of a water repellent layer having a multilayer structure, the water repellent layer including:

a first water repellent layer, as an outermost layer, having a water contact angle of 80° or more, which is formed of a cured product of a first water repellent resin composition comprising a first water repellent resin and inorganic fine particles dispersed therein; and a second water repellent layer, as provided directly below the first water repellent layer, having a flexural modulus of 3 to 7 GPa or a hardness of 0.18 to 0.30 GPa, which is formed of a cured product of a second water repellent resin composition comprising a second water repellent resin, wherein the liquid ejection head further includes a lower resin layer provided between the second water repellent layer and the substrate, which is formed of a resin containing a molecule having an epoxy group, and wherein the method includes a step of laminating the second water repellent resin composition containing the second water repellent resin on the lower resin layer and then heating it.

* * * * *